Oct. 14, 1930.  O. J. KUHLKE  1,778,500
APPARATUS FOR MAKING MOLDS
Filed April 27, 1929  4 Sheets-Sheet 1
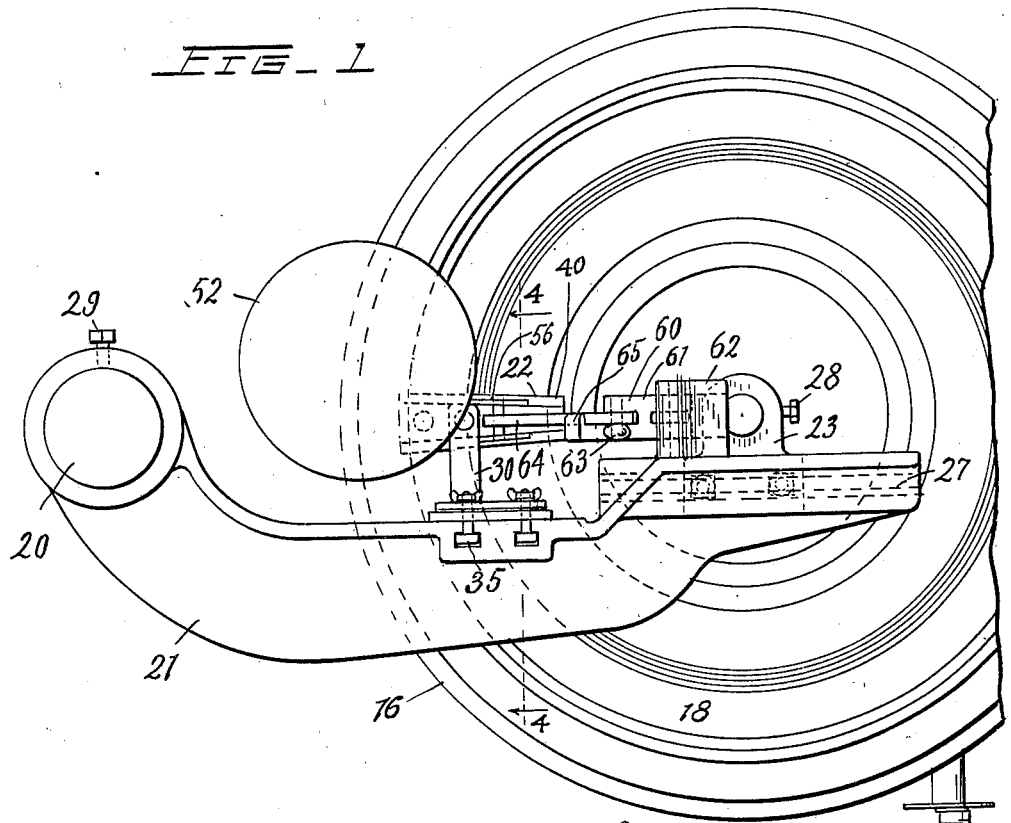
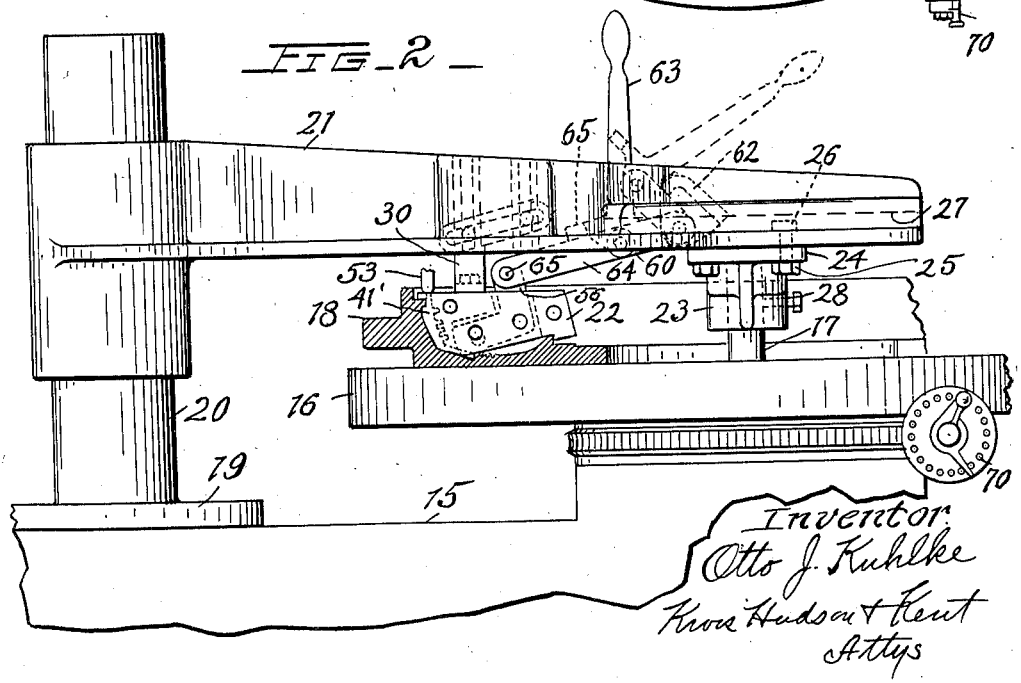
Inventor
Otto J. Kuhlke
Knox Hudson & Kent
Attys

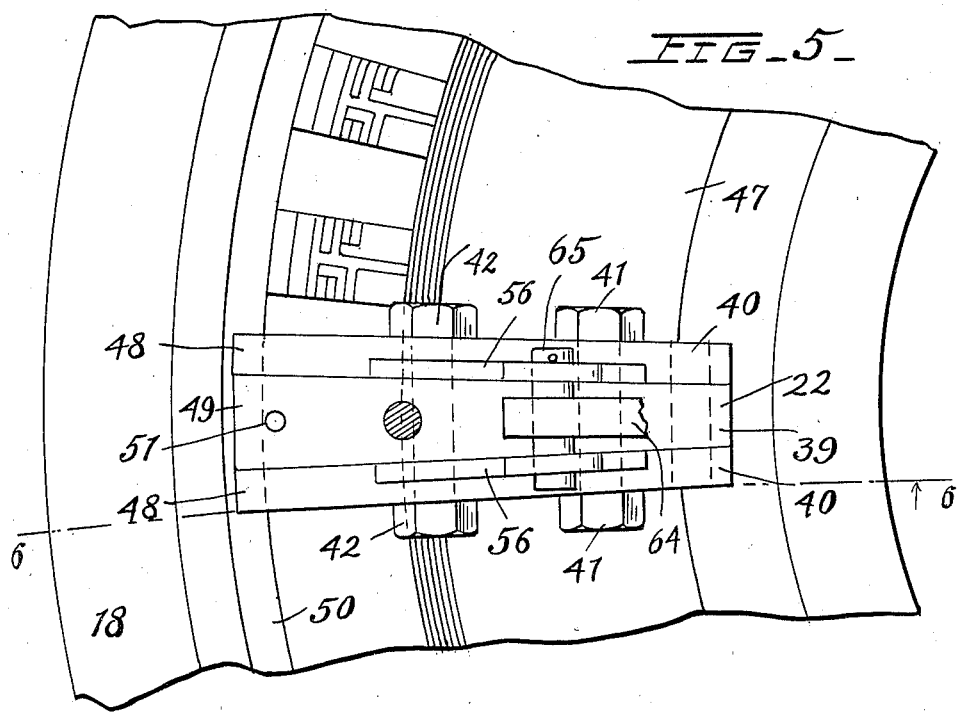
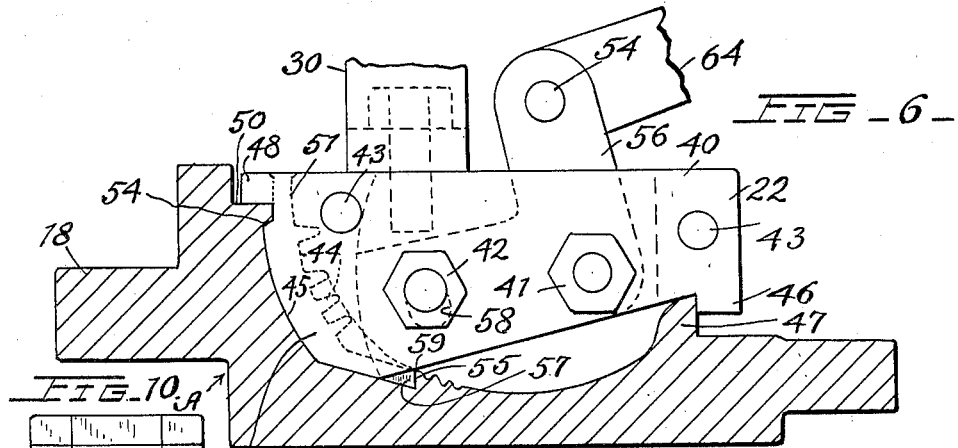
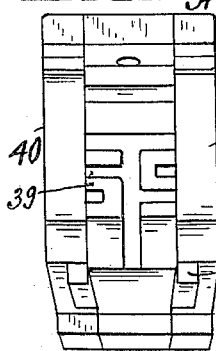
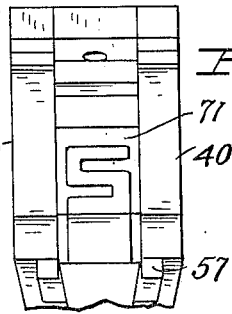

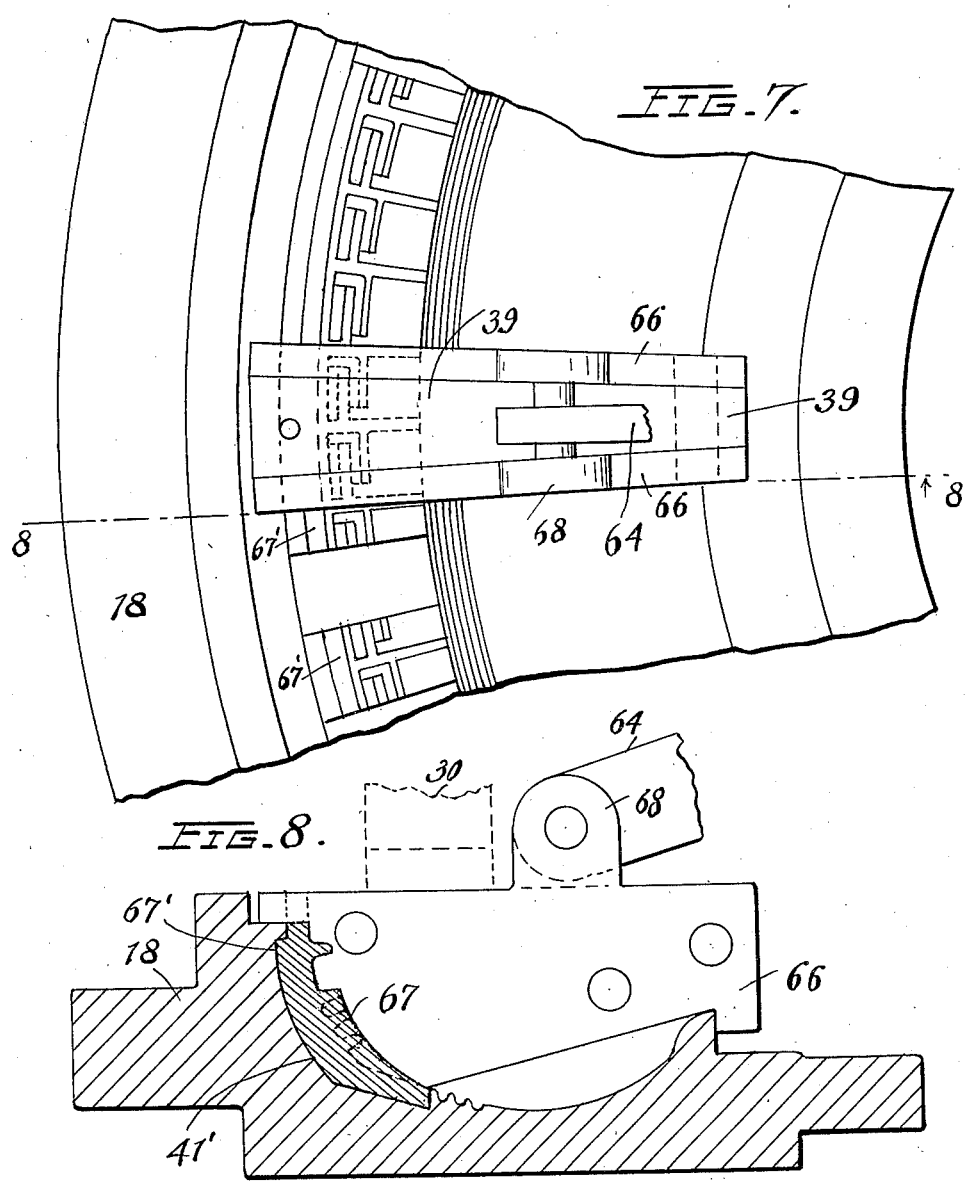

Patented Oct. 14, 1930

1,778,500

UNITED STATES PATENT OFFICE

OTTO J. KUHLKE, OF AKRON, OHIO, ASSIGNOR TO NATIONAL RUBBER MACHINERY COMPANY, OF AKRON, OHIO, A CORPORATION OF OHIO

APPARATUS FOR MAKING MOLDS

Application filed April 27, 1929. Serial No. 358,659.

This invention relates to vulcanizing or curing molds for making rubber tires and for analogous uses, and relates further to apparatus for making such molds.

Molds of this type are generally made of metal and usually consist of complementary mold sections provided with molding faces or surfaces in which is sunk or engraved a recurring pattern or design which is to appear on the outer surface of the finished article. These molds must be very accurately constructed, and as the work of sinking or engraving the pattern in the molding faces can be accomplished only by highly skilled workmen, the cost of constructing such molds is extremely high.

It is, therefore, an object of this invention to provide apparatus with which accurate molds of this type can be constructed at low cost.

Another object is to provide a novel form of apparatus for making molds having pattern molding portions die-cast in place.

Other objects and advantages of my invention will be apparent from the following description taken in conjunction with the accompanying sheets of drawings in which:

Fig. 1 is a plan view, with parts broken away, showing mold-forming apparatus constructed according to my invention.

Fig. 2 is a side elevation of this apparatus with parts broken.

Fig. 5 is a plan view showing the die member in position in a mold section for casting one of the spaced units.

Fig. 6 is a cross section taken on line 6—6 of Fig. 5.

Fig. 7 is a plan view showing the die member in position in a mold section for casting a unit in one of the intervening spaces.

Fig. 8 is a cross section on line 8—8 of Fig. 7.

Fig. 10 is an end view of the die member of Fig. 6, taken in the direction of the arrow A, and showing one form of die block.

Fig. 11 is an end view of the die member of Fig. 6, taken in the direction of the arrow A, and showing another form of die block.

Figure 9:
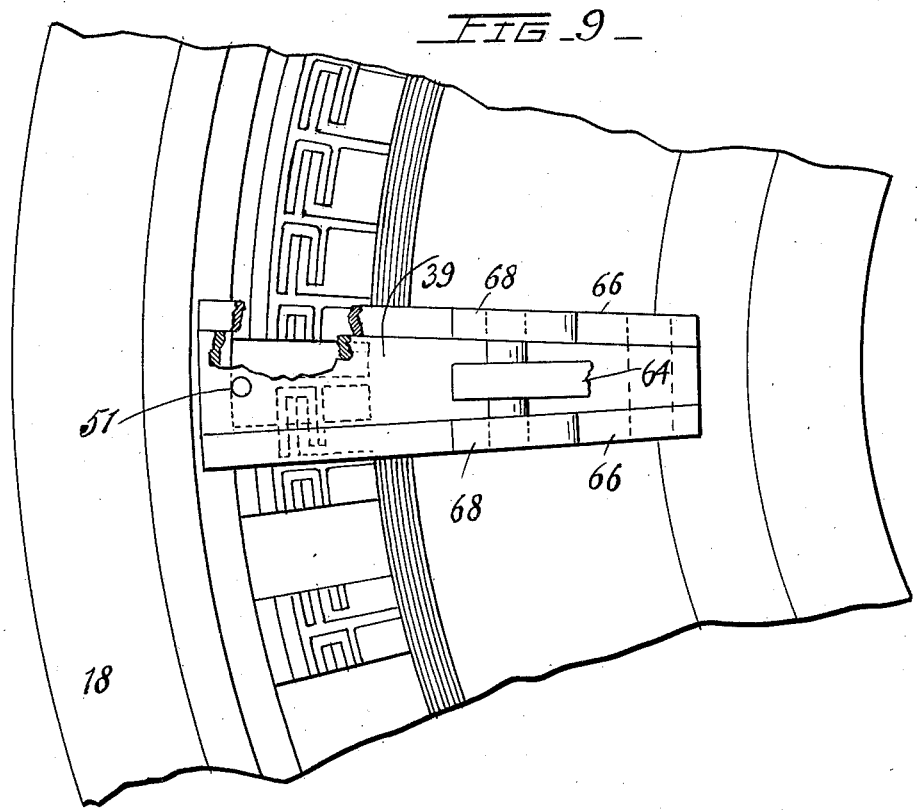
Fig. 9 is a plan view with parts broken away showing the position of the die block when the die member is in position for casting a unit in one of the intervening spaces.

The tire or article molds constructed according to my invention consist of the usual complementary mold sections adapted to be clamped together, and while I have shown the mold sections in this instance as being ring-shaped, it should be understood that my invention is not limited in its application to ring-shaped mold sections. Each of these mold sections is provided with a molding face formed therein, and is also preferably provided with an annular recess formed in a portion of the molding face, and according to my invention the tread or pattern forming portions of the mold are cast in place of these annular recesses.

In Figs. 1 and 2 of the drawings I show an arrangement of apparatus for casting these tread or pattern forming portions of the mold in place in the mold sections. This apparatus consists of a casting machine having a base 15 upon which is mounted a revolvable platen or table 16 for supporting a previously formed mold section 18. The mold section is adapted to be secured to the platen 16 in any convenient manner in concentric relation with the axial spindle 17, which is the axis of rotation of the platen. A plate 19 is slidably mounted upon the base 15, and carries an upright column 20 upon which is pivotally mounted a horizontally extending supporting member or arm 21. This arm 21 is vertically adjustable on the column 20, and arranged to extend above the platen 16 to support a die member 22, and the die member actuating mechanism to be described hereinafter.

A bracket 23 is mounted upon the spindle 17, so as to be vertically adjustable thereon, and has a face 24 against which one end of the arm 21 is adapted to be clamped by means of bolts 25 provided with heads 26 engaging in T-slots 27 formed in the arm. It will now be readily seen that the supporting member or arm 21, when mounted in this manner upon the column 20 and the bracket 23, may be adjustably moved both vertically and horizontally with respect to the platen 16, so as to bring the die member 22 supported by the arm, into a desired position above the mold section 18 supported on the platen. When adjustments have been made to bring the die member into this desired position the bolts 25 and the set screws 28 and 29 are tightened to securely hold the arm 21 in place.

Figure 4:
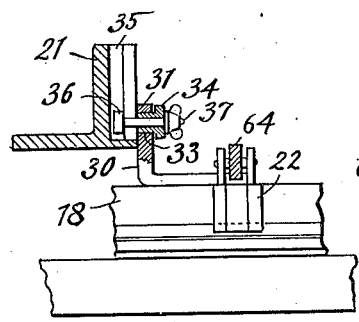
Fig. 4 is a fragmentary sectional elevation taken on line 4—4 of Fig. 1.
Figure 3:
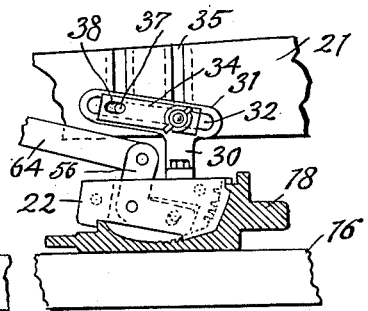
Fig. 3 is a fragmentary side elevation of the mold-forming apparatus showing the die member supporting bracket.

For operably supporting the die member from the arm 21, I provide a die member supporting bracket 30 which is adjustably and reciprocably mounted upon the arm. As clearly shown in Figs. 3 and 4, the bracket 30 is provided with an angularly disposed head 31 having an inclined slot 32 which receives the leg 33 of the T-shaped clamping and guiding member 34. The leg 33 is made slightly longer than the thickness of the head 31, so that when the member 34 is clamped against the arm 21, clearance will be provided, permitting a reciprocable sliding movement of the head.

To permit adjustment of the clamping and guiding member 34 in a vertical direction, T-slots 35 are provided in arm 21 to receive the heads 36 of the bolts 37. To allow adjustment of the clamping and guiding member in a substantially horizontal direction, I provide slots 38 in this member for the passage of the bolts 37.

The adjustments provided for positioning the arm 21 relative to the platen 16 permit the apparatus to be set to accommodate mold sections of different sizes, while the adjustments provided for the clamping and guiding member permit this member to be positioned so as to accurately guide the movements of the die member toward and away from the mold section.

By reference to Figs. 5 and 6 it will be seen that the die member 22 supported by bracket 30 consists of a die block 39 having side plates 40 secured thereto by means of bolts 41, 42 and dowel pins 43. The end 44 of the die block has engraved or sunk therein the pattern or character representation which is to be formed in the face of the pattern-molding portion. The ends 45 of the side plates 40 are shaped to fit within the annular recess 41', which is formed in the molding face of the section, so as to hold the die block in spaced relation to the bottom wall of this annular recess, thus forming a die cavity of which the ends of the side plates form two of the sides, while the bottom wall of the annular recess and the end of the die block form the other two walls. The die block and the side plates secured thereto are preferably shaped to provide the shouldered portion 46 which bears against the annular shoulder 47 of the mold section, while at the opposite end of the die member extensions 48 are formed on the side plates and an extension 49 on the die block, which extensions bear upon the annular portion 50 of the mold section when the die member is in position for casting one of the pattern molding units. A pouring hole 51 extends through the die block 39 to admit metal to the die cavity. Metal is supplied to the die cavity in molten form, and under pressure, from the container or cylinder 52, in a well-known manner, by means of the spout 53 which is held against the pouring hole 51 formed in the die block.

In order to retain the pattern molding units in place in the mold section, the annular recess 41' is preferably provided with an inclined wall 54 and an undercut wall 55. Since the die member must be withdrawn from the annular recess after each unit has been cast, and the direction of this movement, or the line of draw, is determined by the outline of the unit cast, the side plates cannot be formed to engage the undercut wall 55. Therefore, for closing the triangular openings left adjacent the undercut wall when the side plates are in position, I provide bell-crank levers 56, which are movable relative to the side plates, and are provided with extensions or lugs 57, which move into engagement with the undercut wall 55 and the bottom of the annular recess 41' to completely close the die cavity. The bell-crank levers 56 lie in recesses formed in the inner faces of the side plates and are pivotally mounted upon the bolts 41. Slotted openings 58 are provided in the bell-cranks 56, through which bolts 42 pass to limit the angular movement of these levers to only the movement necessary to withdraw the lugs 57 from engagement with the undercut wall 55. As shown in Figs. 5 and 6, the die member is in position to form a die cavity for casting one of the pattern-molding units in place in the mold section. In addition to closing the triangular opening adjacent the undercut wall, the lugs 57, carried by the bell-crank levers 56, serve also as a means for locking the die member against movement relative to the mold section during the casting operations. It should also be stated, that with the die member 22 in position to form the die cavity, the lower edge of the die block bears against and is tangent to the mold section at the point 59 so as to prevent the metal from escaping from the die cavity, and also to provide a smooth connection between the die-cast unit and the mold sections.

For successively positioning the die member relative to the mold section to form die cavities, and for withdrawing the die member after casting each unit, I provide a bell-crank lever 60 having one arm 61 pivotally connected to an extension 62 formed upon the arm 21, and the other arm arranged to form the operating handle 63. The bell-crank lever 60 is operatively connected with the bell-crank levers 56 by means of the link 64, which has one end pivotally connected to the bell-crank 60, and the other end pivotally connected to a pin 65 extending through the bell-cranks 56. The arm 61 of the bell-crank 60 and the link 64 are arranged to form a toggle, so that by movement of the operating lever 63 these parts can be moved into alignment and considerable force applied to the die member 22 through the bell-cranks 56, to thereby properly position the die member and lock the same in place. An extension 65 formed integral with the bell-crank lever 60 serves as a stop for limiting the movement of the operating lever in one direction when the link 64 and the arm 61 have moved into alignment, while the extension 62, carried by the arm 21, serves as a stop for the bell-crank lever 60 when the operating lever 63 has been swung to move link 64 and arm 61 out of alignment.

With the parts in the position shown in Figs. 2 and 6, the die member is in place for casting one of the pattern-molding units. After the unit has been cast the operating lever 63 is moved toward the dotted-line position. The initial movement of the lever retracts the lugs 57 from engagement with the undercut wall 55. Further movement of the operating lever toward the dotted line position causes the die member to be withdrawn from the annular recess of the mold section. During this movement the die member is supported and guided by the supporting bracket 30.

After one block or unit of the pattern-molding portion has been cast in place, in the annular recess 41' formed in the molding face of the section, and the die member has been withdrawn, the platen 16 is rotated through a predetermined angular distance, moving the mold section relative to the die member 22, so that another block or pattern-molding unit may be cast. After the platen and the mold section supported thereon, have been moved through the desired angular distance, the operating lever 63 is moved from the dotted-line position toward the vertical position shown in Fig. 2. When moved in this direction motion is transmitted from the lever through the link 64 and the bell-crank levers 56 to the die member 22. The inclined slot 32 of the die supporting bracket 30 moving relative to the fixed clamping and guiding member 34, guides the movement of the die member laterally and downwardly into position for casting another pattern-molding unit.

The annular movement of the platen 16, and of the previously formed mold section 18 carried thereby, is regulated by means of an indexing mechanism 70, which may be of conventional form and need not be further described in connection with my invention. By means of this indexing mechanism the circumference of the mold section carried upon the platen may be divided into the desired number of parts, so that the blocks or pattern-molding portions cast by the die member can be accurately located in predetermined positions.

According to one method of operating the apparatus of my invention the casting of the pattern-molding units is divided into two operations. The first operation consists in casting a series of pattern-molding units at spaced intervals around the circumference of the annular recess of the mold section, as shown in Figs. 5 and 6. The second operation illustrated, in Figs. 7 and 8, consists in casting a second series of units to fill the intervening blank spaces left between the units cast during the first operation. For the first operation the die member consists of the die block 39 and the side plates 40, and the units cast during this operation are of substantially the same width as the width of the die block. These units cast during the first operation are preferably spaced apart a distance which is somewhat less than the width of the units themselves, so that when units are cast in the intervening spaces during the second operation, the die block will overlap the edges of the units cast during the first operation, as clearly shown in Fig. 9. During the second operation the previously cast units form the side walls of the die cavity and the overlapping of these units by the die block prevents the escape of the metal. Since the units cast during the first operation form the side walls of the die cavities, and the die block overlaps these units, side plates are not necessary during the second operation and may be omitted. However, I find that the use of side plates affords a convenient means for connecting the die block to the actuating mechanism. When side plates are used during the second operation, they are of the type shown in Fig. 8, designated 66, and differ from the type of side plates used during the first operation in that the end portions 67 are shaped to fit against the previously cast units 67' instead of the bottom of the annular recess 41', and also, in that the bell-crank levers are not required, and connection between the die member and the actuating mechanism is made by means of the ears 68 formed integral with the side plates 66.

I have stated that the units cast during the first operation are preferably spaced apart a distance which is less than the width of the units themselves, but obviously this spacing is not necessary, and if desired the units cast during the first operation may be spaced apart a distance which is equal to the width of the units themselves. The blocks cast in the intervening spaces during the second operation would then be of the same width as the blocks cast during the first operation, and there would be no overlapping of the previously cast units by the die block, the escape of metal from the die cavity then being prevented by the side plates 66 bearing against the previously cast units.

When the blocks or pattern molding portions are cast according to the method just described the shrinkage of the metal of each unit, during cooling, is confined to that particular unit and does not affect the adjoining units. Furthermore, when the units are cast alternately, according to this method, the mold section must be rotated through one complete revolution to form the first series of these units, and there is ample time for these units to cool before the second series of units is cast to fill the intervening blank spaces. By permitting the first series of units to cool before the second series is cast, the metal of the units of the first series has shrunk so that these units assume their ultimate dimensions before the second series is cast in the intervening blank spaces, and when the second series is cast, the shrinkage of the metal composing each unit of the second series is, likewise, limited to that particular unit. Since the amount of metal which composes each block is small, the amount of shrinkage which takes place will be so small that there will be but slight tendency for the blocks to separate from each other and leave spaces therebetween. Furthermore, by confining the shrinkage in this manner to each particular block, the positions which the blocks are to assume can be very accurately predetermined, so that when all the blocks have been cast in place they will exactly fill the annular recess and form an accurate pattern-molding portion having recurring patterns of equal size and equally spaced.

According to another method of using the apparatus of my invention, all of the units forming the pattern-molding portion may be cast during one revolution of the platen 16 and the mold section carried thereby. Three operations are required in this method, the first operation being the casting of the initial unit, the second operation consists in casting the successive units exclusive of the very last one, and the third operation consists in casting the last unit. By this method the units are cast side by side without leaving intervening blank spaces, and for the first operation I employ the die member 22 having a die block 39 and side plates 40, as shown in Fig. 6. For the second operation one of the side plates 40 is removed and is replaced by one of the side plates 66, shown in Fig. 8. The side plate 66 bears against the unit previously cast, while the projection 45 of the side plate 40 bears against the bottom wall of the annular depression. For the third operation, that is the casting of the very last unit, the die member consists of a die block 39 and two of the side plates 66, each bearing against a previously formed unit. For each of these operations the die member is operatively connected to the actuating mechanism by the pivotal connection between the link 64 and the side plates. During the second operation, where side plates of two different types are used, this link is connected only to the bell-crank lever 56 of the side plate 40, so as to permit the normal operation of this bell-crank lever.

In carrying out this second method the units of the second and third operations may be cast with the die block in overlapping relation with the unit or units previously cast or, if desired, the die member may be so positioned that there will be no overlapping and then each of the blocks successively cast will be the same width as the die block. When the die block does not overlap the previously cast unit or units, the escape of the metal from the die cavity is prevented by the side plates bearing against the previously cast units or the bottom of the annular recess 41'.

After the three operations of this method have been completed, the metallic blocks or units which have been cast will exactly fill the annular recess forming equally spaced recurring patterns of the same size.

In Figs. 10 and 11 I show end views looking in the direction of the arrow A of Fig. 6, of different types of die blocks which may be used in casting the recurring pattern-molding units according to the methods I have described. For the purpose of illustration, these die blocks are shown as having the letter S formed thereon in relief. In Fig. 10 I show the die block 39 carrying two parts of such letter with an intervening space between them. It will be noted that the parting line has been arranged to pass through two adjacent characters. When units are cast using this die block, the parts of the letters cast on one unit register with the parts of the letters cast on the adjoining unit, so that when a series of juxtaposed units has been cast, a series of complete characters will have been formed. By casting units having parts of letters in this manner, any variations in the size or positioning of the units forming the pattern-molding portions will not be noticeable in the finished mold, since they will occur in the letters rather than in the spaces between the letters. In Fig. 11 I show an end view of a die member having another form of die block. This die block 71 is provided with a completed letter formed in relief, and so positioned that the parting lines will fall upon the divisions or depressions between adjacent letters. When a series of juxtaposed units is cast by this die member a series of letters or characters will be formed with intervening spaces, and any irregularities or variations occurring in the size or positioning of the units will cause corresponding variations in the width of the spaces between adjacent letters.

It will now be readily seen that I have provided apparatus by means of which the mold sections are provided with tread or pattern molding portions formed of metallic units die-cast in place. The die-casting of these pattern-molding portions can be done very accurately according to my invention, and at a cost much less than would be the cost of sinking or engraving the pattern-molding portions into the molding faces of the mold sections.

While I have described the apparatus of my invention in a detailed manner, it should be understood that I do not limit my invention to the precise details shown and described, but regard my invention as including such changes and modifications as do not involve a departure from the spirit of my invention and the scope of the appended claims.

Having thus described my invention, I claim:

1. In a mold-forming apparatus, the combination of means for holding a mold section, a die member, and means for successively positioning said die member with a part thereof in spaced relation to different portions of said mold section to form die cavities for casting recurring pattern-molding units in said mold section.

2. In mold-forming apparatus, the combination of means for holding a mold section, a die member, means for successively positioning said die member with parts thereof in spaced relation to different portions of said mold section to form die cavities for casting pattern-molding units in said mold section, and means for supplying molten metal to said die cavities.

3. In mold-forming apparatus, the combination of means for supporting a mold section having a molding face formed therein, a die member, means for successively positioning said die member with a part thereof in spaced relation to different portions of said molding face to form die cavities for casting pattern-molding units in said mold section, means for supplying molten metal to said die cavities, and means for preventing relative movement between said mold section and said die member during the casting operations.

4. In mold-forming apparatus, the combination of means for holding a mold section having a molding face formed with an annular recess therein, a die member, means for successively positioning said die member with a part thereof in spaced relation to the bottom of said recess to form die cavities for casting pattern-molding units in said mold section, and means for supplying molten metal to said die cavities.

5. In mold-forming apparatus, the combination of means for holding a mold section having a molding face formed with an annular recess therein, a die member, means for successively positioning said die member with a part thereof in spaced relation to the bottom of said recess to form die cavities for casting pattern-molding units in said metal to said die cavities, and means for preventing relative movement between said venting relative movement between said mold section and said die member during the casting operations.

6. In mold-forming apparatus, the combination of means for movably supporting a mold section, a die member comprising a die block and side plates cooperating therewith, means for successively positioning said die member relative to said mold section to form die cavities for casting recurring pattern-molding units in said mold section, and means for supplying molten metal to said cavities.

7. In mold-forming apparatus, the combination of means for movably supporting a mold section, a die member comprising a die block and side plates cooperating therewith, means for successively positioning said die member relative to said mold section to form die cavities for casting pattern-molding units in said mold section, means for supplying molten metal to said cavities, and means for preventing relative movement between said mold section and said die member during the casting operations.

8. In mold-forming apparatus, the combination of means for holding a mold section, a supporting member, means carried by said supporting member and adapted to be positioned with respect to the molding face of said section to form a die for casting pattern-molding portions in said mold section, and means for supplying molten metal to said die.

9. In mold-forming apparatus, the combination of a platen adapted to support a mold section, an arm extending above said platen, means carried by said arm and adapted to be held against the molding face of said section to form a die for casting pattern molding portions in said mold section, and means for supplying molten metal to said die.

10. In mold-forming apparatus, the combination of means for holding a mold section, a supporting member adapted to be adjustably positioned with respect to said holding means, means carried by said supporting member and adapted to be held against the molding face of said section to form a die for casting pattern-molding portions in said mold section, and means for supplying molten metal to said die.

In testimony whereof, I hereunto affix my signature.

OTTO J. KUHLKE.

CERTIFICATE OF CORRECTION.

Patent No. 1,778,500. Granted October 14, 1930, to

OTTO J. KUHLKE.

It is hereby certified that error appears in the printed specification of the above numbered patent requiring correction as follows: Page 5, line 75, strike out the syllable and words "venting relative movement between said"; and that the said Letters Patent should be read with this correction therein that the same may conform to the record of the case in the Patent Office.

Signed and sealed this 17th day of February, A. D. 1931.

(Seal)

M. J. Moore,
Acting Commissioner of Patents.

DISCLAIMER 1,778,500.—*Otto J. Kuhlke*, Akron, Ohio. APPARATUS FOR MAKING MOLDS. Patent dated October 14, 1930. Disclaimer filed May 21, 1932, by the assignee, *National Rubber Machinery Company*.

Hereby enters this disclaimer to claims 1, 2, 3, and 4 in said patent, which are in the following words, to wit:

"1. In mold-forming apparatus, the combination of means for holding a mold section, a die member, and means for successively positioning said die member with a part thereof in spaced relation to different portions of said mold section to form die cavities for casting recurring pattern-molding units in said mold section.

"2. In mold-forming apparatus, the combination of means for holding a mold section, a die member, means for successively positioning said die member with parts thereof in spaced relation to different portions of said mold section to form die cavities for casting pattern-molding units in said mold section, and means for supplying molten metal to said die cavities.

"3. In mold-forming apparatus, the combination of means for supporting a mold section having a molding face formed therein, a die member, means for successively positioning said die member with a part thereof in spaced relation to different portions of said molding face to form die cavities for casting pattern-molding units in said mold section, means for supplying molten metal to said die cavities, and means for preventing relative movement between said mold section and said die member during the casting operations.

"4. In mold-forming apparatus, the combination of means for holding a mold section having a molding face formed with an annular recess therein, a die member, means for successively positioning said die member with a part thereof in spaced relation to the bottom of said recess to form die cavities for casting pattern-molding units in said mold section, and means for supplying molten metal to said die cavities."

[*Official Gazette June 14, 1932.*]